(12) United States Patent
Duvall et al.

(10) Patent No.: US 6,441,830 B1
(45) Date of Patent: Aug. 27, 2002

(54) STORING DIGITIZED AUDIO/VIDEO TRACKS

(75) Inventors: Roger M. Duvall, Garden Grove; Richard J. Oliver, Laguna Beach; Jeffrey M. Claar, Aliso Viejo, all of CA (US)

(73) Assignees: Sony Corporation, Toyko (JP); Sony Pictures Entertainment, Inc., Culver City, CA (US)

( * ) Notice: Subject to any disclaimer, the term of this patent is extended or adjusted under 35 U.S.C. 154(b) by 0 days.

(21) Appl. No.: 08/937,064

(22) Filed: Sep. 24, 1997

(51) Int. Cl.$^7$ ................................................. G06F 3/00
(52) U.S. Cl. .............................. lp;1p345/716; 345/723; 345/744; 345/762
(58) Field of Search ................................ 345/328, 302, 345/335, 333, 329, 326; 364/514

(56) References Cited

U.S. PATENT DOCUMENTS

| | | | | |
|---|---|---|---|---|
| 5,307,456 A | * | 4/1994 | MacKay ....................... 345/154 |
| 5,467,288 A | * | 11/1995 | Fasciano et al. ......... 364/514 R |
| 5,623,690 A | * | 4/1997 | Palmer et al. ............... 345/806 |
| 5,636,283 A | * | 6/1997 | Hill et al. ...................... 381/17 |
| 5,990,884 A | * | 11/1999 | Douma et al. .............. 345/327 |
| 5,995,094 A | * | 11/1999 | Eggen et al. ............... 345/328 |
| 6,025,838 A | * | 2/2000 | Bardon et al. .............. 345/328 |

* cited by examiner

*Primary Examiner*—Raymond J. Bayerl
*Assistant Examiner*—Cuong T. Thai
(74) *Attorney, Agent, or Firm*—Blakely, Sokoloff, Taylor & Zafman LLP

(57) ABSTRACT

A method and apparatus for storing digitized audio/video tracks. A plurality of lists are created wherein each of the plurality of lists defines a characteristic of the audio/visual data. The plurality of lists are linked according to a data structure such that performing an edit operation on a portion of the audio/visual data results in the edit operation being applied to the plurality of lists.

18 Claims, 15 Drawing Sheets

| Mach,Trk 1. | Track Name | S | R | I | S | M | Gain | | Mach,Trk ID | Track Name | S | R | I | S | M |
|---|---|---|---|---|---|---|---|---|---|---|---|---|---|---|---|
| 15, 1 | FX L | | | | | | 0 dB | | 15, 5 | Foley L | | | | | |
| 15, 2 | FX C | | | | | | 0 dB | | 15, 6 | Foley C | | | | | |
| 15, 3 | FX R | | | | | | 0 dB | | 15, 7 | Foley R | | | | | |
| 15, 4 | FX S | | | | | | 0 dB | | 15, 8 | Foley S | | | | | |

FIG. 8A

STORING DIGITIZED AUDIO/VIDEO TRACKS

FIELD OF THE INVENTION

The present invention relates to the field of audio/video editing. Specifically, the present invention presents a method and apparatus for storing digitized audio/video tracks.

DESCRIPTION OF RELATED ART

Currently, audio/video editing is most frequently performed according to the system illustrated in FIG. 1. An editing workstation today includes local disks on which audio/video is stored. Editing may be performed via a display screen, but is limited to the locally stored audio/video data. This type of a system provides insufficient functionality for editing a large amount of audio/video data stored on multiple workstations.

More specifically, this system is insufficient because current editing workstations do not perform editing across the boundaries of workstations, over networks. Audio/video data on each workstation must be edited separately, and the output of the editing may then be input into a mixing console to create a final audio/video output. If there are any problems with the final audio/video output, then the tedious process of editing the various audio/video data tracks residing on each separate workstation has to be repeated. This process continues until the final output is satisfactory.

SUMMARY OF THE INVENTION

The present invention discloses a method and apparatus for storing digitized audio/video tracks. A plurality of lists are created wherein each of the plurality of lists defines a characteristic of the audio/visual data. The plurality of lists are linked according to a data structure such that performing an edit operation on a portion of the audio/visual data results in the edit operation being applied to the plurality of lists.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which:

FIG. 6, comprising

FIG. 8, comprising FIGS. 8A and 8B, illustrates one example of a graphical user interface for a different type of user.

FIG. 9, comprising

DETAILED DESCRIPTION OF THE PREFERRED EMBODIMENT

The present invention is a method and apparatus for storing digitized audio/video tracks. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1:
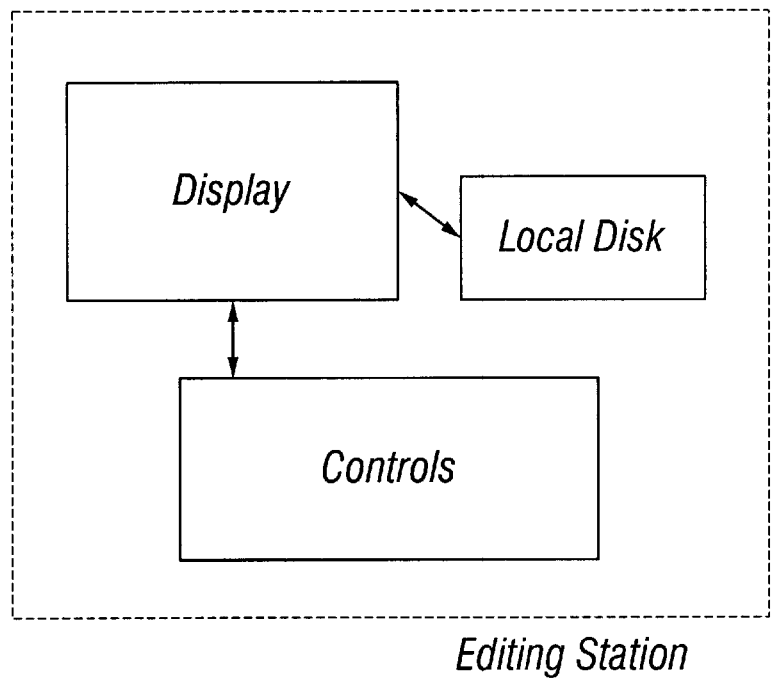
FIG. 1 illustrates a prior art audio editing method.
Figure 2:
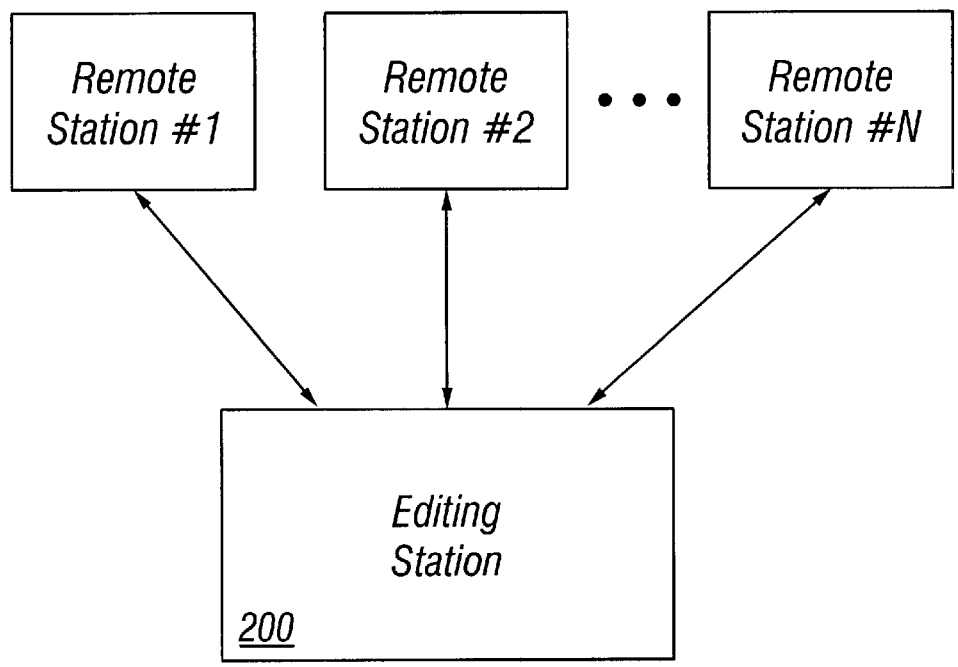
FIG. 2 illustrates an overview of one embodiment of the present invention.

FIG. 2 illustrates an overview of one embodiment of the present invention. Although the following sections describe an audio editing process, the same technique may be successfully applied to a video editing process. As illustrated, the system according to the present invention comprises at least one editing station coupled to a plurality of remote stations (remote stations 1–N). Remote stations 1–N contain audio/video data stored in digitized form on one or more storage disks. According to this embodiment of the present invention, a sound engineer may edit the digitized data residing on any of remote stations 1–N from a single location, namely editing station 200. The sound engineer may also edit the digitized data across remote stations 1–N, e.g. by copying audio from a track on one station and pasting the cut audio onto a track on another station. Editing operations across remote stations are described in further detail below.

Editing station 200 may be a personal computer (PC) or any other type of system capable of displaying a graphical application, accepting input via the graphical application and communicating the input to a remote location. Remote stations 1–N may also comprise a PC or a proprietary audio/video storage/editing station such as a Sony® Corporation player/recorder system. Remote stations 1–N may include slots for multiple removable disks, such as Iomega Jaz disks, that increase the storage available to the remote station and allow the stored data to be easily moved from one remote location to another.

Figure 3:
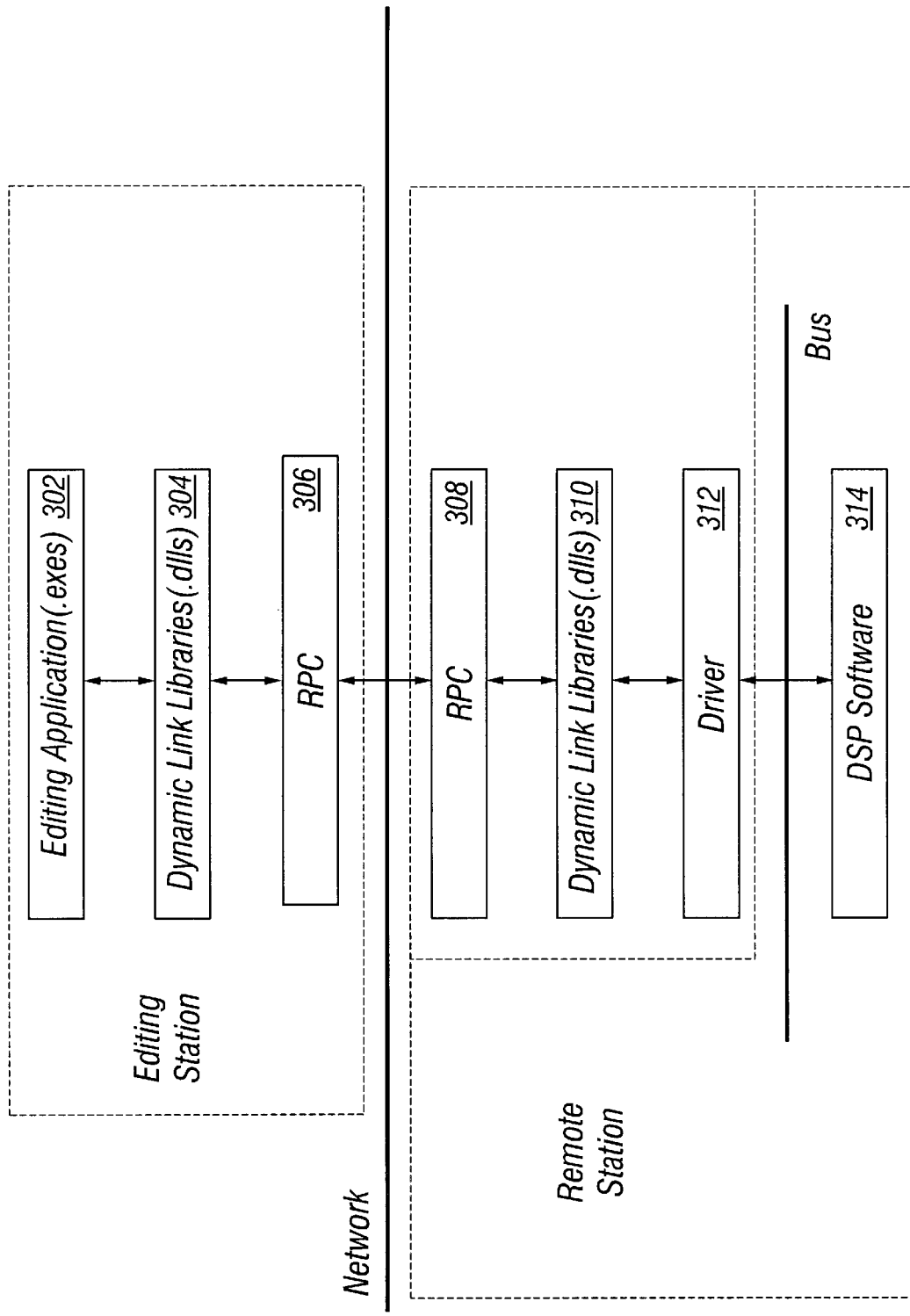
FIG. 3 illustrates in further detail the software modules according to one embodiment of the present invention.

FIG. 3 illustrates the software modules according to one embodiment of the present invention. Editing station 200 includes editing application 302, dynamic link libraries (DLLs) 304, and a Remote Procedure Call (RPC) mechanism 306. Editing application 302 allows the sound engineer to perform editing functions via a graphical user interface (GUI). RPC mechanism 306 provides a communication link between the editing station and the remote stations 1–N (from FIG. 2). According to one embodiment of the present invention, RPC mechanism 306 is a Microsoft® Windows NT based RPC mechanism. Alternate RPC mechanisms or other network mechanisms for remote communication may also be utilized.

FIG. 3 also illustrates an example of the software modules on an exemplary remote station according to one embodiment of the present invention. The exemplary remote station comprises RPC mechanism 308 (corresponding to RPC mechanism 306 on editing station 300), DLLs 310 and a driver mechanism 312 that interacts with Digital Signal Processing (DSP) system 314. A sound engineer interacts with remote stations 1–N from editing station 200 via a GUI, the functions specified via the GUI are communicated between editing station 200 and remote stations 1–N via RPC mechanism 306 and 308, and DLLs 310 and DSP system 314 perform all necessary processing to implement the specified functions.

Figure 4:
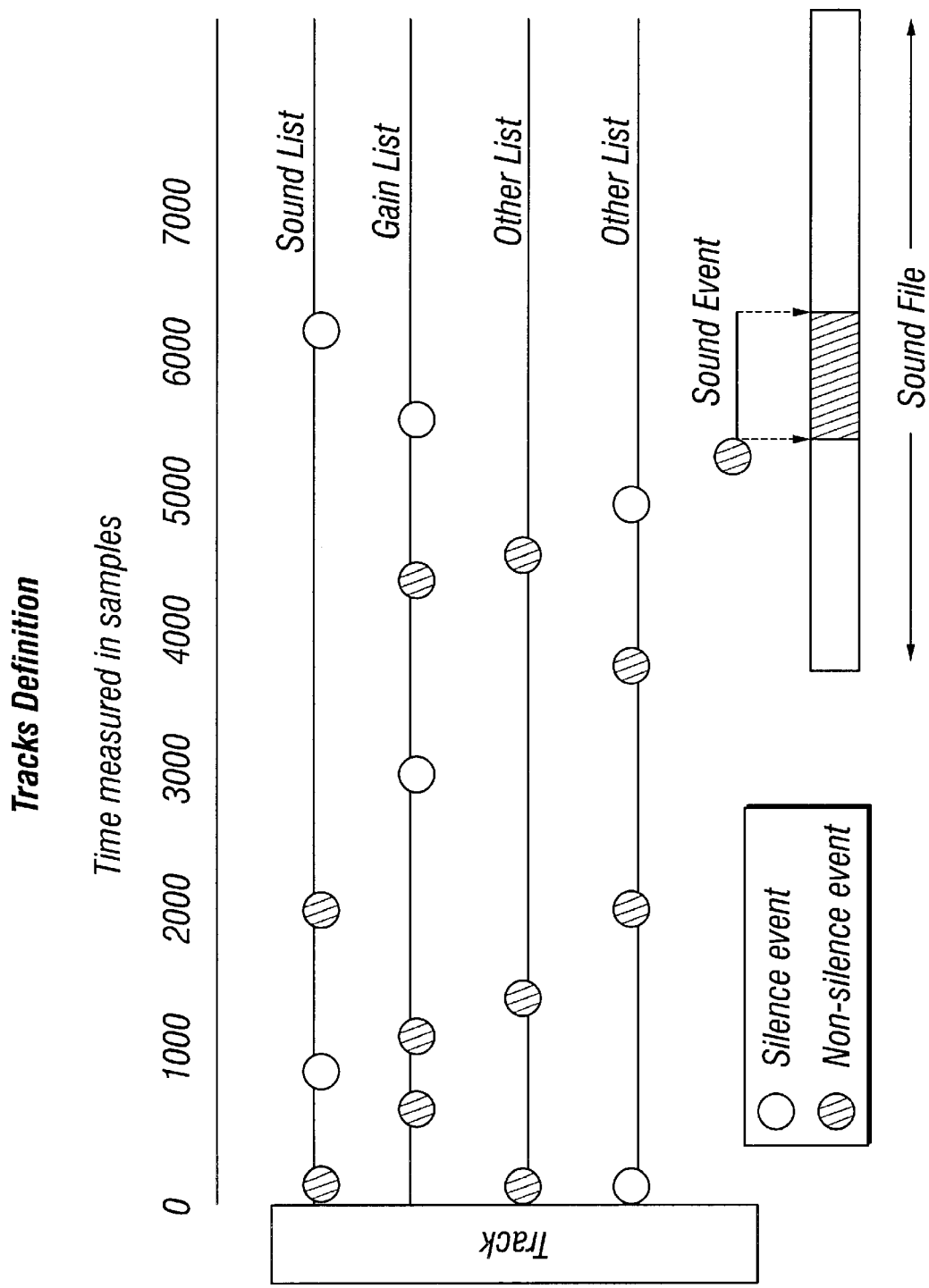
FIG. 4 illustrates a data structure defining a track according to one embodiment of the present invention.

FIG. 4 illustrates the data structure of an audio track on an exemplary remote station according to one embodiment of the present invention. An audio track is a static representation of audio that specifies the location of audio data on a disk, the organizational data necessary to correctly playback the audio data as well as a variety of other parameters associated with the audio data. According to one embodiment of the present invention, the various parameters associated with audio data are each specified in a list.

The various lists illustrated in FIG. 4 therefore correspond to a single audio track. This track is represented by a data structure that links all the lists together in a logical fashion. By using a single data structure to link all the lists together, one embodiment of the present invention allows all data associated with a particular track of audio to be edited collectively by a common editing interface. Thus, for example, if a sound engineer decides to edit a portion of an audio track, all lists associated with that portion of the audio track may be edited simultaneously, unlike prior art systems in which various aspects of the track may have to be edited separately.

The mechanism that performs edits across the track data structure of FIG. 4 involves several components. According to one embodiment, the components are implemented as C++ classes. The primary components are: Tracks, EventLists and Events. Each of theses components is illustrated in FIG. 4, and described in further detail below. Although the following description assumes a C++ implementation, the same or similar functionality may be implemented in other programming environments.

A "track" is a public object that is used by audio applications to represent static streams of audio and other time based data. A track is implemented as a named object (i.e. has a string name) that maintains a collection of event lists (described below). A track exposes an edit interface that is applied to each event list. According to one embodiment, a track maintains at least one event list, namely the SoundList (see FIG. 4).

"Event lists" are doubly linked data structures that maintain two basic types of events. The default event is termed a "silence" event and the other event is termed a "non-silence" event. There is a separate event list for each type of silence/non-silence event combination. For example, as illustrated in FIG. 4, solid color-filled circles along the time of the audio represent the occurrence of sound while unfilled circles represent silence. Other lists are also contemplated. For example, as shown in FIG. 4, the gain list illustrates how much gain is applied to particular portions of an audio track. For example, the solid filled circle indicates that a certain scalar value of gain is to be applied while the unfilled circle represents that unity gain is to be applied. FIG. 4 also shows "other lists" which, as is now apparent to one skilled in the art, can include a variety of parameters including parameters related to video or other editing operations. Each type of event maintains at minimum a length measured in samples and other data needed to define the event behavior. According to one embodiment, virtually all of the edit behavior of event lists is implemented in a C++ class.

Each type of event maintains two important virtual functions: SlideStart( . . . ) and SlideEnd( . . . ). When new non-silence events are created, each event must reimplement these functions. This is due to the fact that when a start and/or end time of an edit operation does not match with the beginning of an event, a "seam" must be created. This is accomplished by copying the appropriate event, "sliding" the end of the source event and then "sliding" the start of the copied event. This sliding mechanism is illustrated in further detail below (see FIG. 5C below).

Event lists are time based data structures that contain linked events where each event maintains at minimum a length measured in samples. The sum of the lengths of all of the events plus the start offset (explained in further detail below) equals the length of the event list. By default, the first event starts at the absolute time of zero samples unless a start offset is present, in which case the first event starts at the value of the start offset. The absolute time (measured in samples) at the start of an event is measured by adding up the lengths of all of the events previous to it including the start offset.

For the purposes of this discussion, tracks and event lists are used interchangeably. Tracks represent multiple event lists. A working event list is a list that contains the events being built to model a specific type of audio behavior. Working events lists are initially created with a very large silence event. Once the working event list has been created, edit operations can be applied to it. Single events can be added to the list by calling an appropriate Add( . . . ) function. In addition, according to one embodiment of the present invention, six primitive edit operations can be applied. They are:

Clear( )
Cut( )
Copy( )
Paste( )
Insert( )
Insert( ) (space)

Tracks, event lists and any other objects that model editing use the above terms when defining an edit interface. The edit operations as they apply to event lists are discussed below and illustrated in FIGS. 5A–E. According to an alternate embodiment of the present invention, other edit operations may also be performed.

Figure 5A:
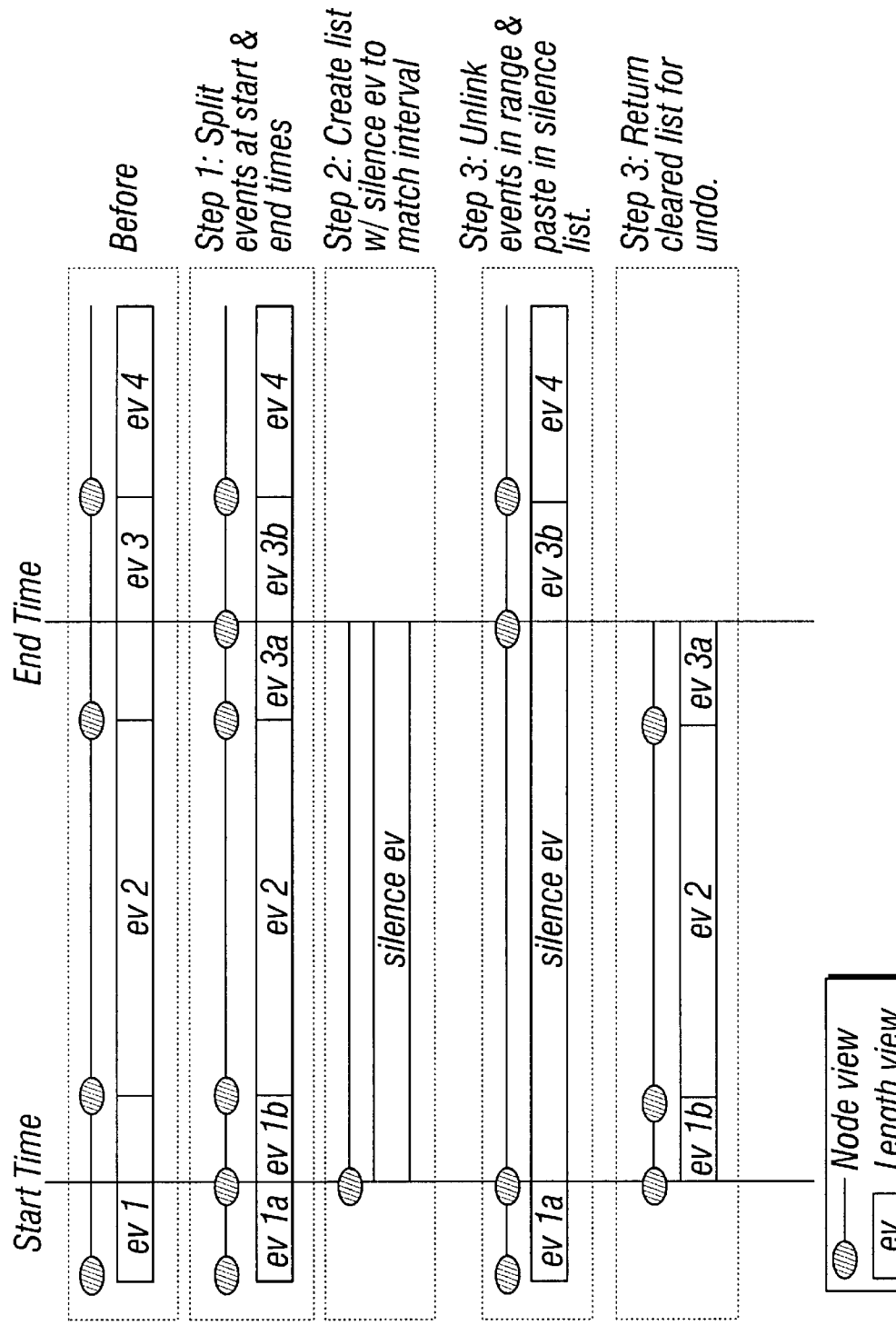
FIGS. 5A–E illustrate various editing operations performed on a track of audio data.
Figure 5B:
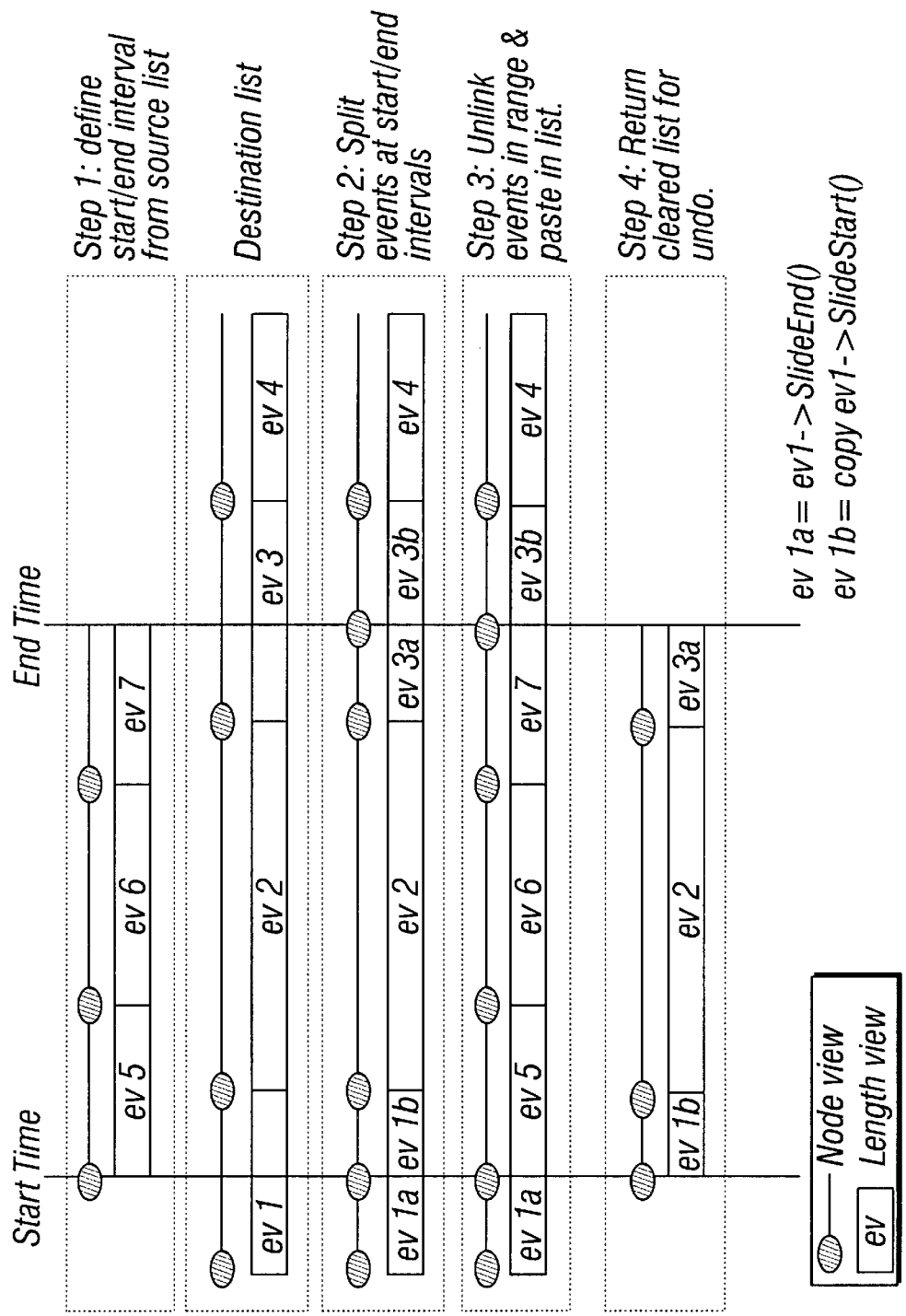
Figure 5C:
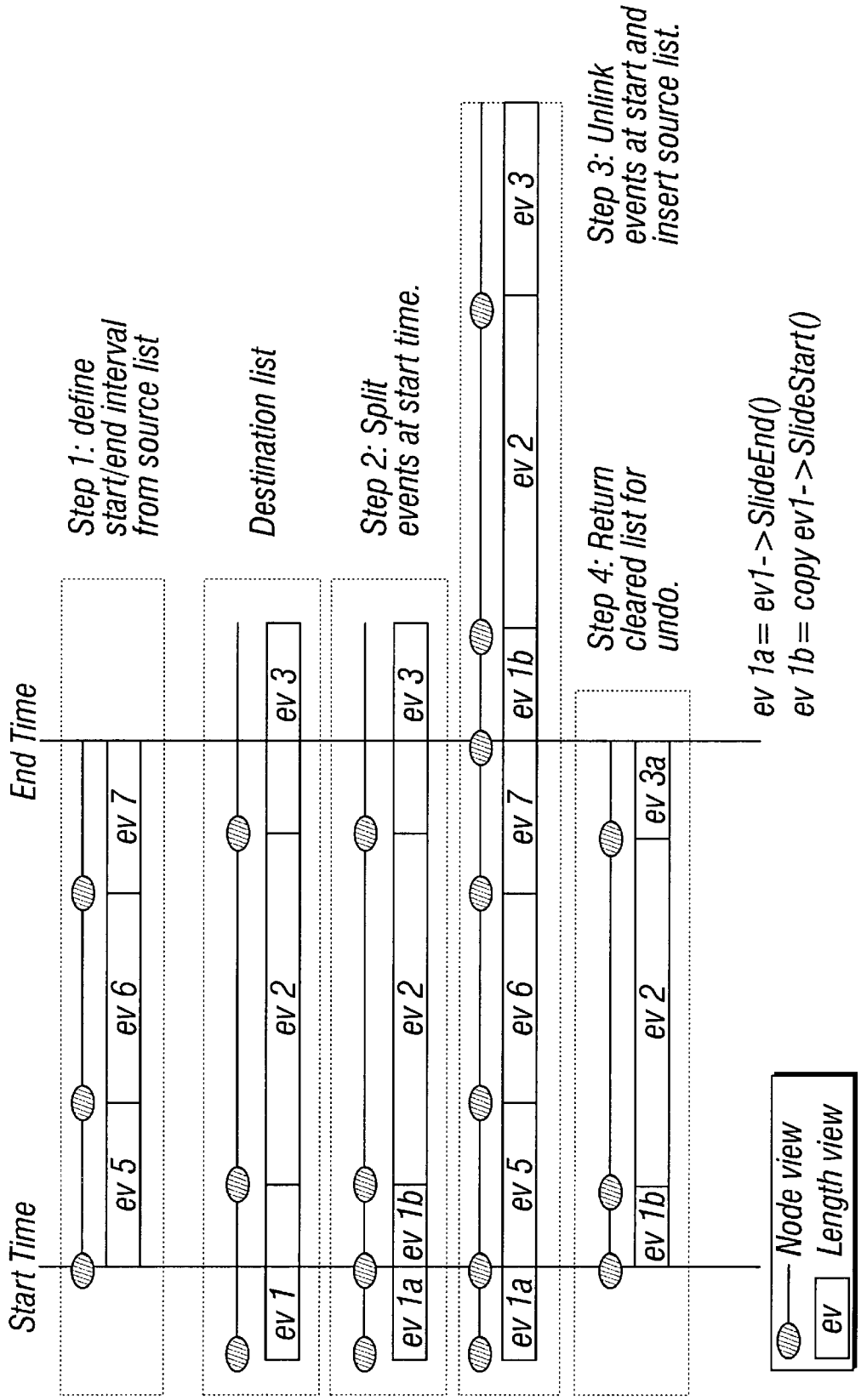

"Clear" replaces a section of events with silence without affecting the times of the events after the end time. Clear is effectively an overwrite operation. The clear edit operation is illustrated in FIG. 5A. "Paste" operations pastes a source list into a destination list. The start and end times of the paste are determined by the source list. Paste operations overwrite, hence the times of events after the end time remain unchanged, as illustrated in FIG. 5B.

Figure 5D:
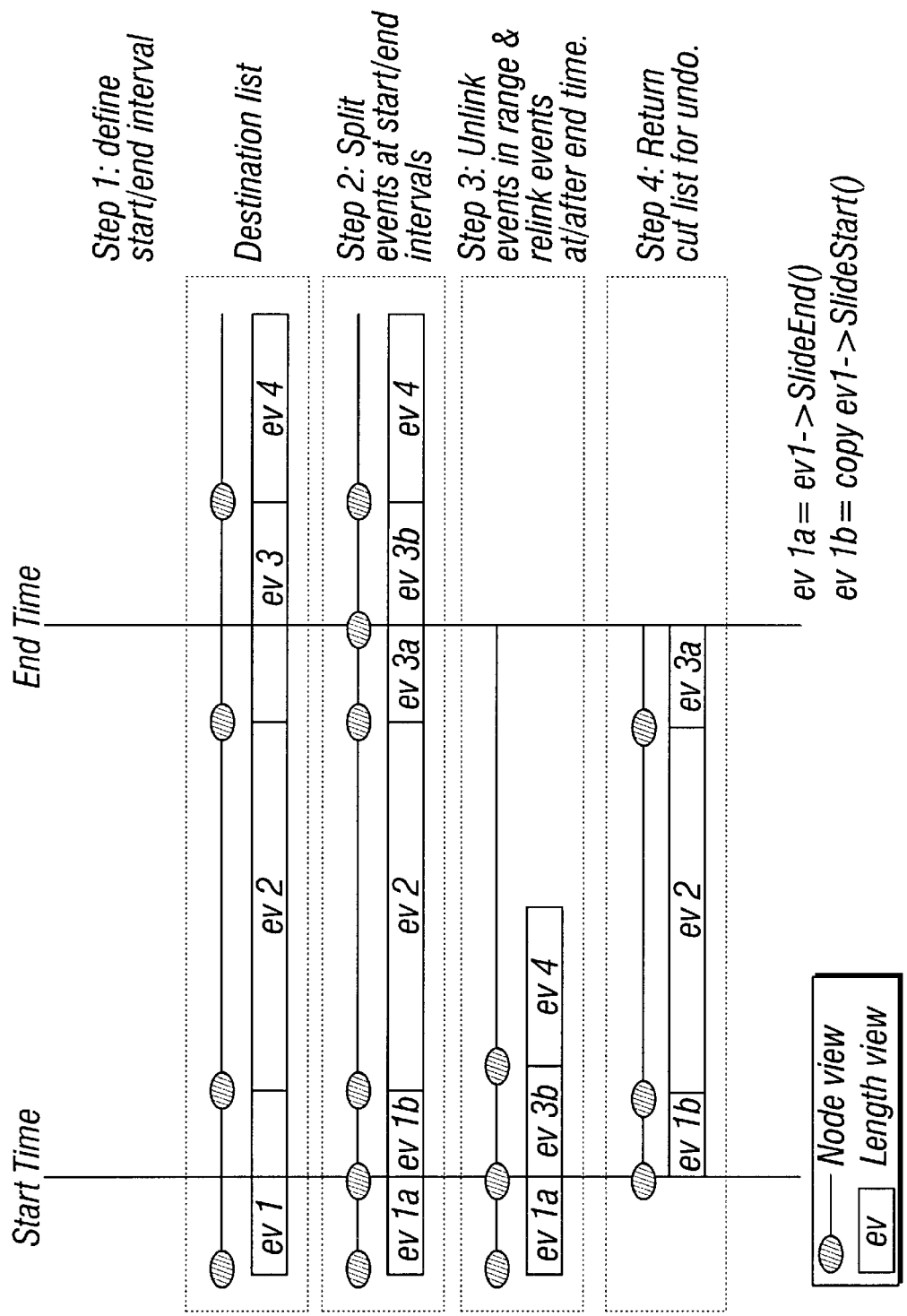
Figure 5E:
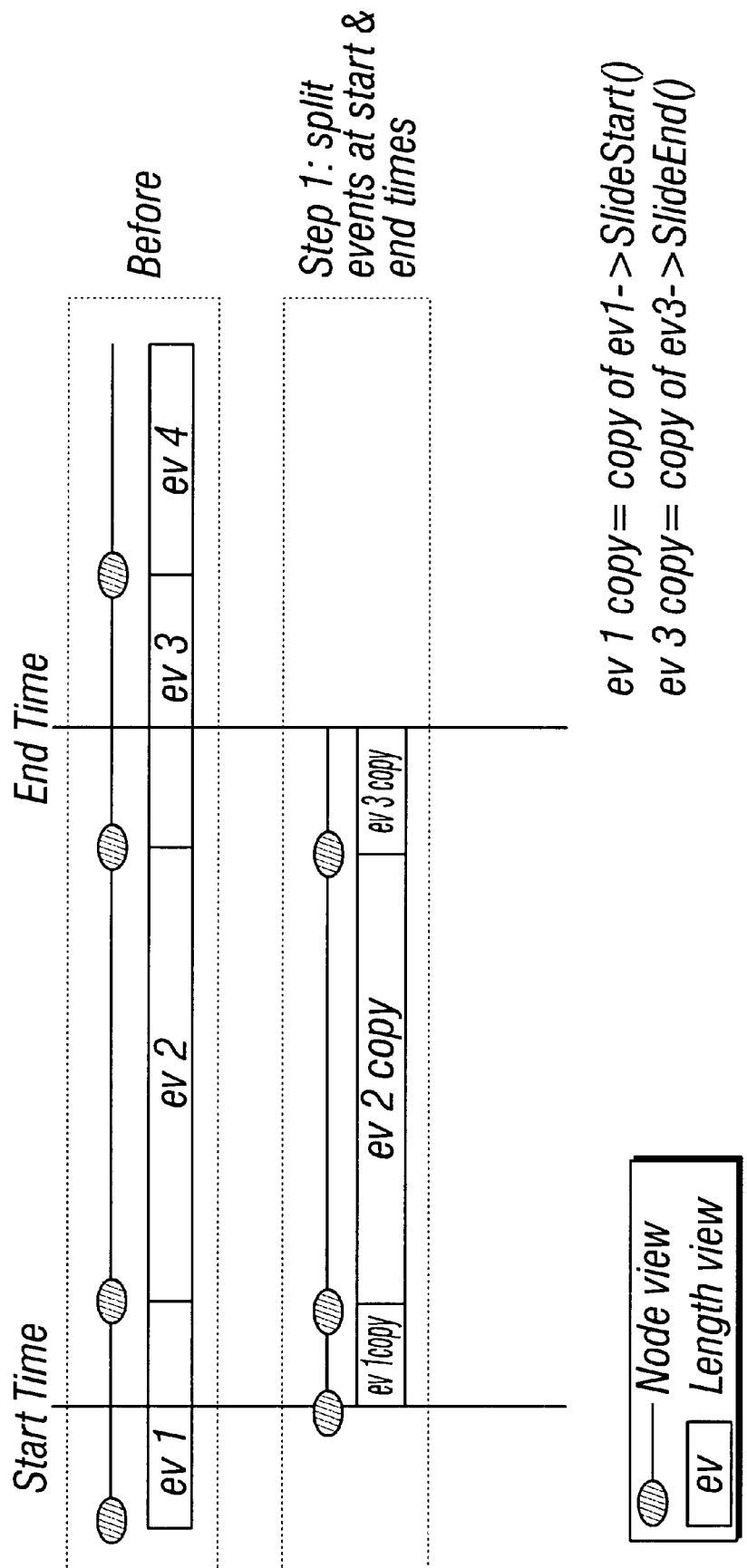

"Insert" operations insert a source list into a destination list. The point of insert is determined by the start time of the source list. The times of all events at and after the point of insert are shifted by the length of the source list. This is shown below in FIG. 5C. "Insert space" simply inserts a blank event list of a specified length instead of a source list into a destination. "Cut" removes a section of events from an event list. All of the events after the end time are shifted earlier in time by the length of the cut piece, as illustrated in FIG. 5D. Finally, "Copy" operations copy a section of an event list while the source list remains unaffected, as illustrated in FIG. 5E.

Figure 6A:
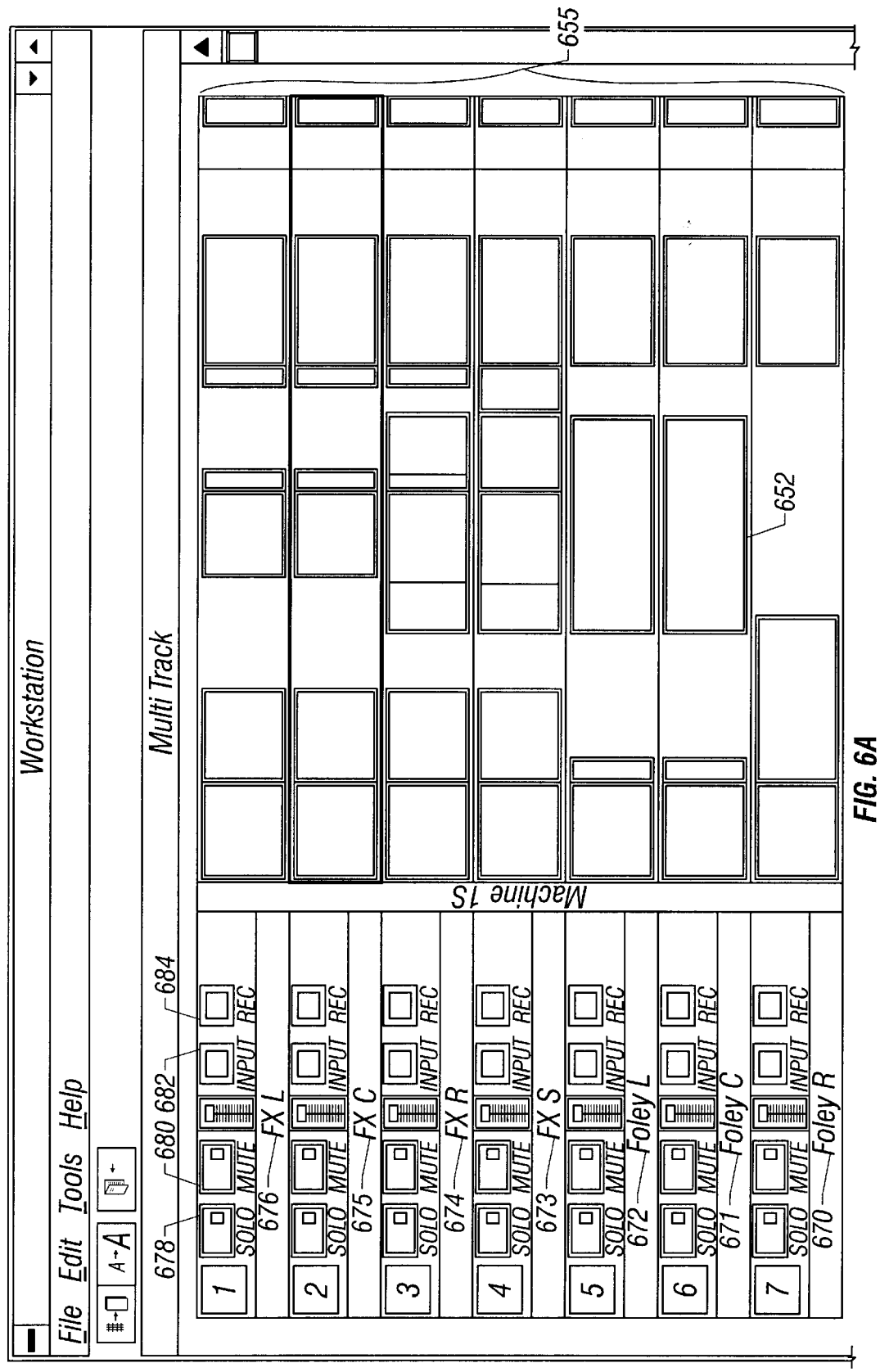
FIGS. 6A and 6B, illustrates an example of the graphical user interface that may be used to perform editing.
Figure 6B:
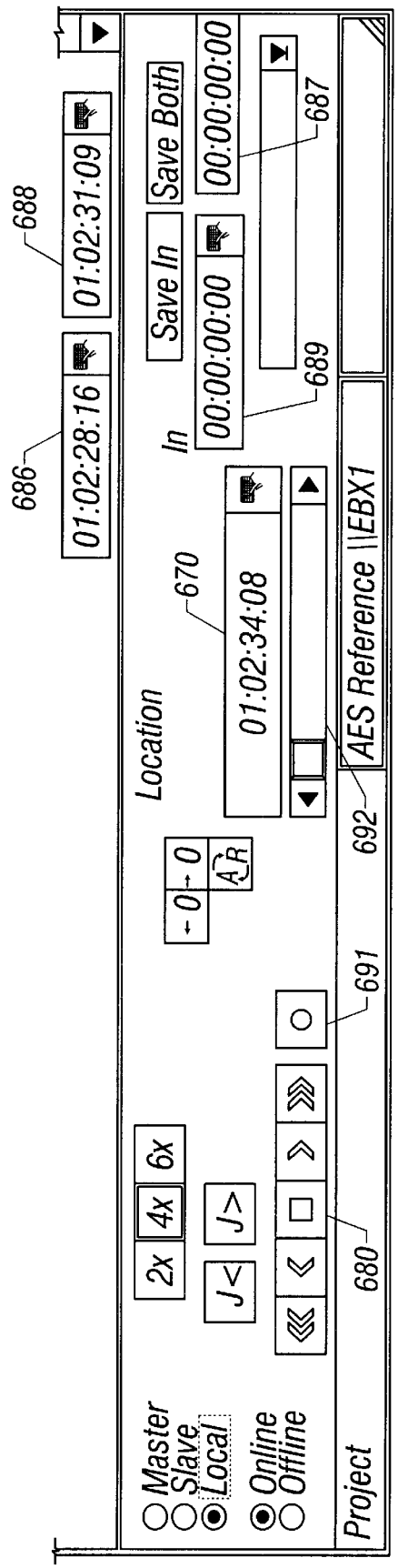

FIG. 6 illustrates an examples of a GUI screen that may be generated by editing application 302 at editing station 200. This GUI screens allows the sound engineer to specify a range for editing functions to be performed on the audio data. For example, the screen in FIG. 6 illustrates a display of seven separate tracks (FXL, FXC, FXR, FXS, FoleyL, FoleyC and FoleyR). These seven tracks may reside on a single station or on separate stations on a network. This ability for a sound engineer to access multiple stations across a network for simultaneous editing from a single remote location represents a significant advancement over the prior art methods of audio/video editing. According to one embodiment of the present invention, the sound engineer can perform multiple edit operations across as many remote stations as he or she desires, thus giving the sound engineer the flexibility to edit a large amount of audio very simply. Thus, for example, a sound engineer may perform any of the edit operations described above to the highlighted portion of the screen. The highlighted portion corresponds to a portion of audio data on multiple tracks of audio data, where each track comprises multiple lists.

The visual representation of the audio allows the sound engineer great flexibility to specify edit functions. For example, the sound engineer may highlight a predetermined portion of the screen and specify edit functions to be performed on the entire highlighted area. This highlighted area, as illustrated in FIG. 6, may include both shaded and unshaded portions of the screen. The shaded portions indicate the active audio portions (non-silence) of each track, while the white spaces indicate silence. When the sound engineer specifies an edit function, the function is applied across the tracks, thus allowing the user to edit the multiple tracks simultaneously. More significantly, these tracks may reside on separate machines across the network, in contrast with the prior art where an editing station could only edit data that resided on a local station.

This ability to perform editing of digitized audio/video data from a single editing station across a network provides significant practical advantages other than simply making the process more efficient. In a current film editing facility, for example, various editing studios may each contain multiple editing stations to edit different portions of audio/visual data, where the output of all the editing stations is input into a mixing console. In the event a machine is reassigned to a different studio, the entire editing station must be physically moved to the new location. In contrast, according to one embodiment of the present invention, the physical remote stations do not have to be moved. Instead, the remote stations may reside at any location, and each studio may simply be assigned a predetermined set of remote stations. In this manner, the number of remote stations assigned to a studio may change on a daily or even hourly basis without significant problems.

Figure 7:
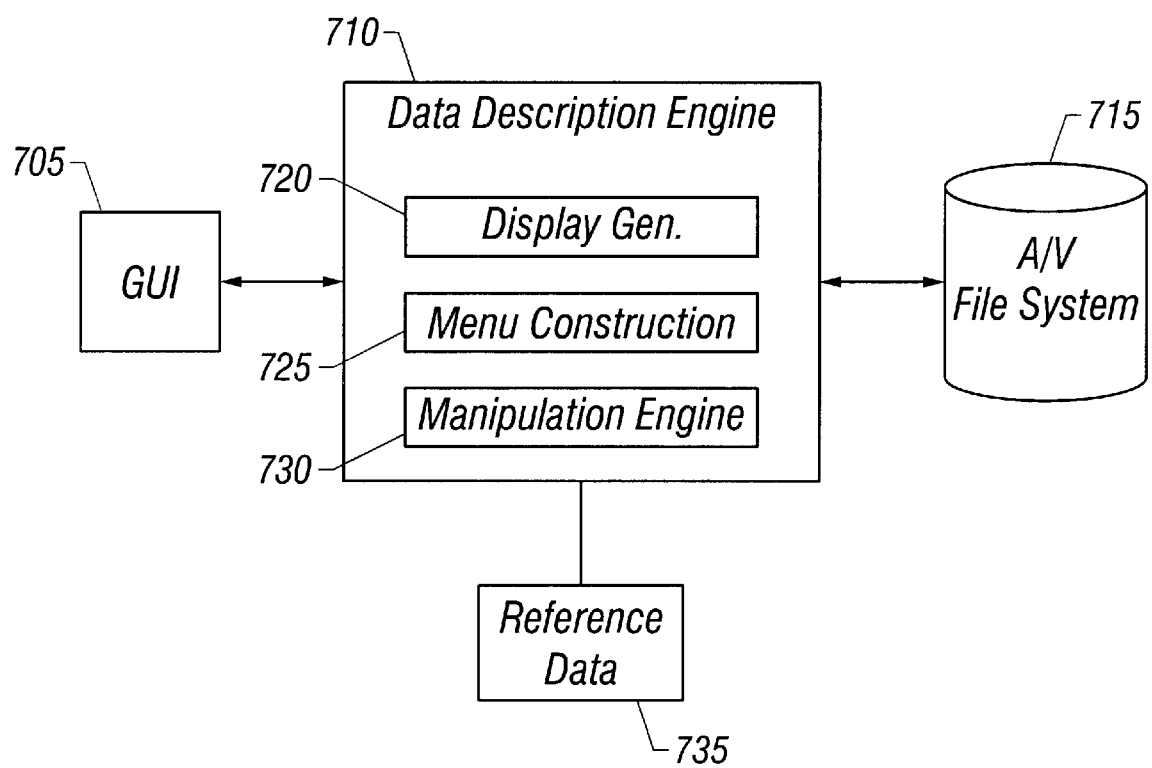
FIG. 7 illustrates one embodiment of a system that generates user configurable interfaces in accordance with the teachings of the present invention.

In an alternate embodiment, the data structure can be utilized to support of a variety of GUIs that are customized for different types of users. For example, in the movie industry, different individuals work on production sound, music composition, music editing and sound editing. The work performed by the different individuals involves access, all or in part, to the data structure, an example of which is illustrated by FIG. 4. However, these different individuals are accustomed to different user interfaces. For example, production sound or music composition people works with bars, measures and beats to identify the particular portions an operation relates to. Sound editors, including mixers, work with SMPTE code. Similarly, if audio for non-video applications was being processed in this system, the different portions of the audio may be identified by a MIDI code. In this alternate embodiment, the system further includes a data description engine as illustrated in FIG. 7. Referring to FIG. 7, the GUI 705 containing the A/V data is created by the data description engine 710 accessing the A/V database 715. The data description engine 710 may be implemented in software to run on existing processors or other processors. Alternately, it may be implemented in a dedicated system of hardware or software. The GUI generated is dependent upon the type of user. Thus, for example, the user may initially be prompted by the data description engine to identify the type of GUI desired, e.g., sound editing, production sound, etc. Alternately, the system may implement a default type of GUI based upon the log-on or some other user identification.

Figure 8B:
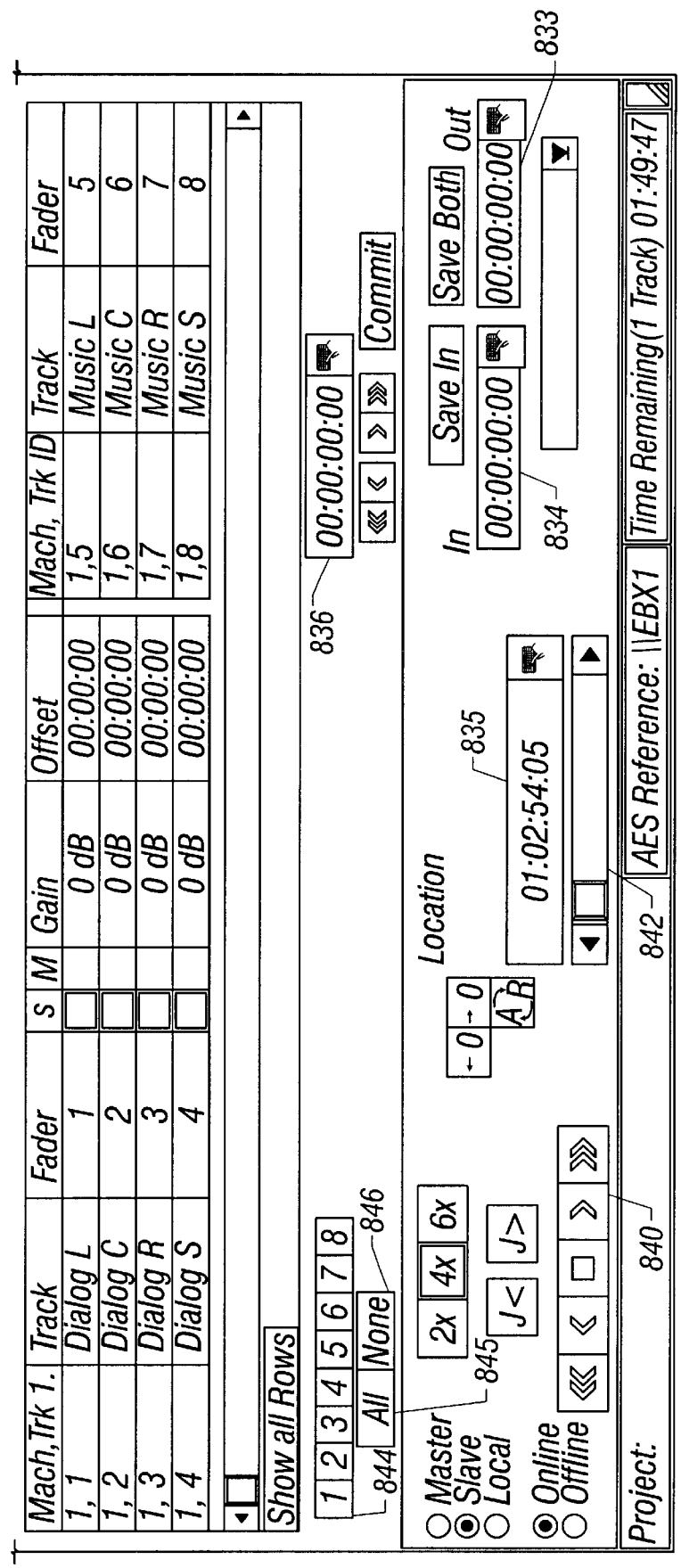

The data description engine accesses the A/V database 715 and the display generator displays the data of interest in a representation configured to the type of user. This is graphically represented by FIGS. 6 and 8. As noted earlier, FIG. 6 is one GUI representation configured for a sound editor. FIG. 8 is a GUI representation for a dubber. It should be noted that the data from the different tracks are represented graphically in a different manner. For example, with reference to FIG. 6, the sound editor is provided a graphical representation of the audio data (e.g., area 655) in addition to providing the identification of the particular audio currently accessed and represented in each of the tracks shown. The dubber display is also provided the identification 805 of the audio data accessed, however, as the editing operations are not performed at a dubbing station, the graphical representation of audio data is not provided. Similarly, dubbing frequently utilizes offsets to offset different tracks relative to each other (e.g. for mixing); however offsets are typically not used in the editing process. Thus, offset fields are provided (e.g., 810) in the GUI of FIG. 8 and not the GUI of FIG. 6.

The representations may be pre-generated and stored, for example in the reference data file 735 or some other memory or storage media. The representation may be stored as descriptive data or executable code (e.g., java script or the like). It should be noted that there may be some commonality of representation. For example, the time codes representing in points, out points etc. (e.g., 686–690 and 830–836) may be the same, depending upon the type of user.

In addition, the menu constructor 725 (FIG. 7) generates the user selectable features/options/operations for the particular type of GUI. As with the data representations, the menus may be pre-generated and stored, for example in the reference data file 735 or some other memory or storage media. The representation may be stored as descriptive data or executable code (e.g., java script or the like). Examples of the different user selectable/features/options/operations can be seen with reference again to FIGS. 6 and 8. In the dubber GUI, several options, such as "s" safety 812, "R" record 814, "I" input 816, "S" Solo 818 and "M" mute 820. These are implemented as buttons, such that when selected by the user, for example, by placing the cursor over the area of the button and "clicking" the mouse/trackball, the function is enabled. For example, the safety button 812 implements a write protect mechanism on the entire track. The record button 814 immediately initiates recording of the input on the selected track. The input button 816 enables the user to hear what is at the input (as opposed to what is at the output). The mute button 820 mutes the selected track and the solo button 818 mutes all the tracks except the selected track.

In the editing GUI of FIG. 6, similar functions are provided, but are some are implemented differently to accommodate how different users operate. As shown, buttons are provide for the solo 678, mute 680, input 682 and record 684 functions. However, unlike a dubbing application, in an editing application implements a tape based multitrack model of recording. Thus, if a user selects the record function, the button will blink to indicate waiting to initiate recording and will change to a solid color to indicate when recording is initiated as controlled by the user selecting a master record button (e.g., button 691) on the display. Once the master record is selected, additional track record buttons can be selected and immediately enabled. Furthermore, if the master record is again selected to turn off the master recording function, the track record buttons will again blink to indicate a waiting to record state.

Identical functions are also provided such as the tape control functions, e.g., fast forward, reverse, play, stop etc.

Figure 9A:
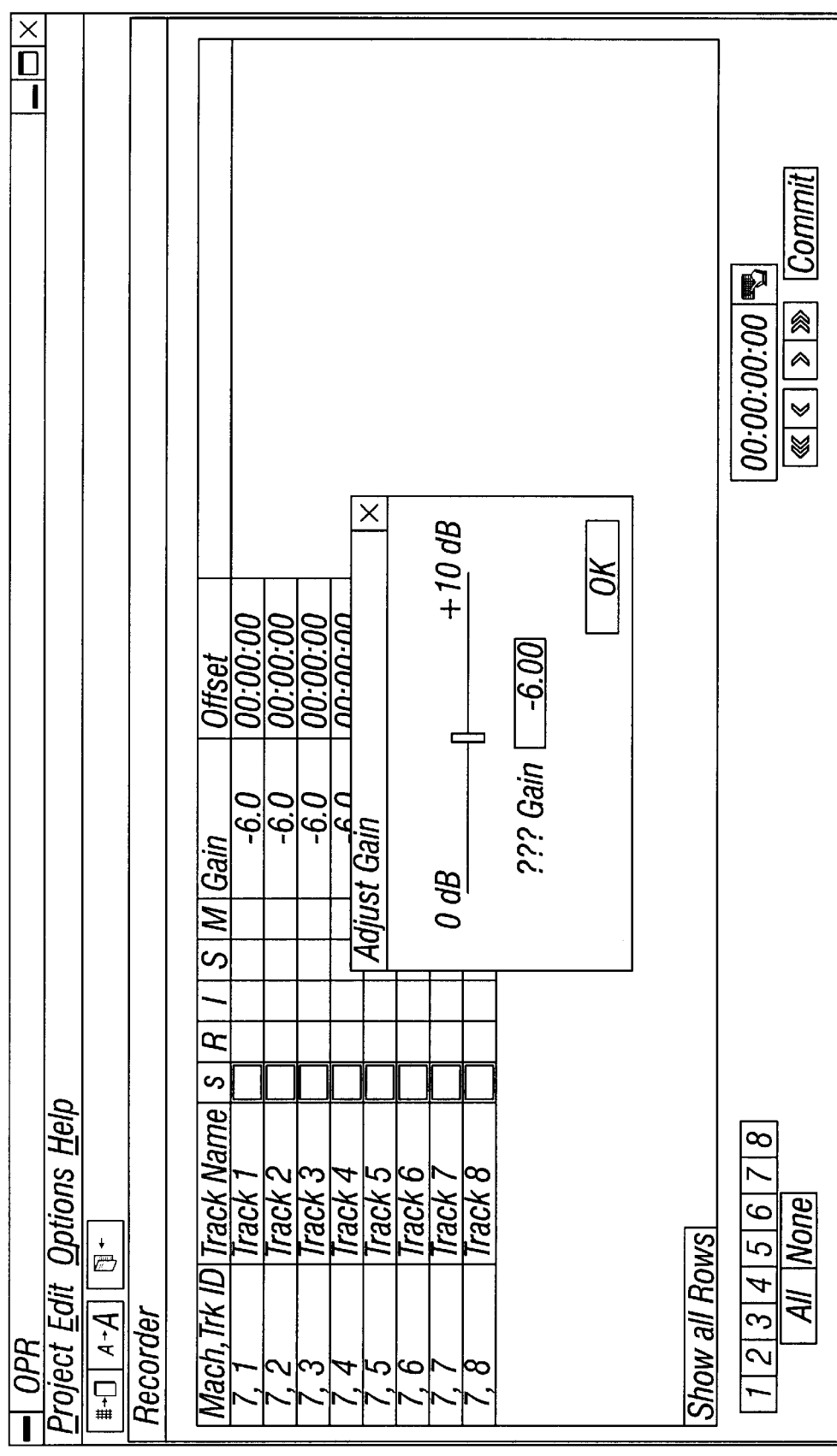
FIGS. 9A and 9B, illustrates an alternate example of a graphical user interface for a particular user.
Figure 9B:
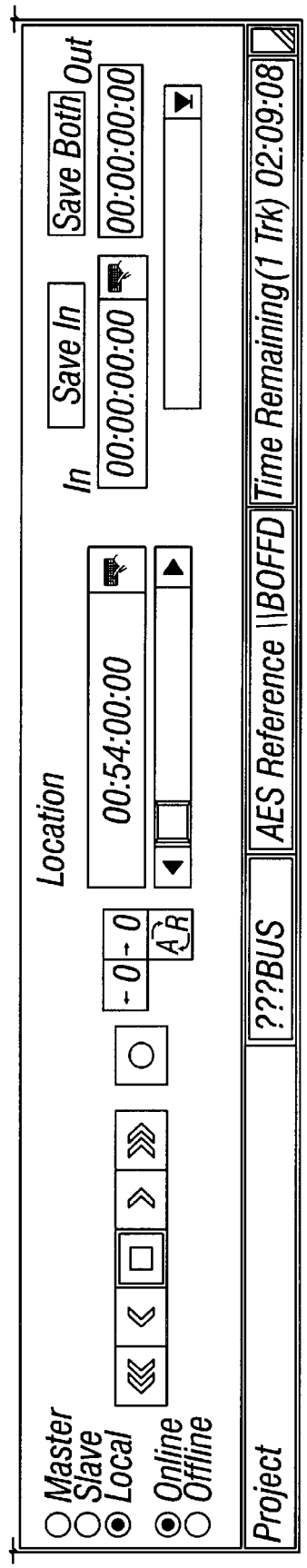

(690 and 840) and scrolling according to time code (692 and 842). In addition, some functions provided are only found in particular types of GUIs. For example, the programmable track selection buttons 844 and "all" 845 or "none" 846 track selection buttons are very useful in the dubbing application wherein the user is manipulating many different tracks at one time. Furthermore, graphically the functions may be represented differently as defined by the menu constructor. For example, the gain value is represented as a slider icon in the editing GUI and as a numerical value in the dubbing GUI. Selection of the gain column or icon in the appropriate GUI will bring up the gain pop up window as shown in FIG. 9 which enables the user to adjust the gain using a graphical slider. It should be noted that FIG. 9 all illustrates an alternate embodiment of a dubber GUI which is user configurable. In this illustration, tracks separately identifying input and output are utilized to simplify the information displayed. Other embodiments are also contemplated.

Once the data and user selectable functions are displayed, the user is able to provide input to the system to perform certain tasks. The user input is preferably processed through the manipulation engine (730, FIG. 7) which interprets the input and generates instructions understood by the system. The advantage is that the user can use the particular nomenclature or "lingo" typically used and the system will understand what needs to be done and how to perform the task. Thus, some functions are unique to a particular type of user and some are common although referred to differently. For example, in sound production one operation is referred to as a "swap", in music editing, the same operation is referred to as "verse" and in sound editing the same operation is referred to as a "take". All three refer to the operation of time stamping from a determined point to record multiple versions of the same sound. Thus the operation of recording the data will be the same although referred to differently by different types of users. The manipulation engine can be implemented a variety of ways. In one embodiment, a dictionary is constructed and stored, for example, on storage device 735 to contain possible user functions and corresponding internal functions. The manipulation engine can then search the dictionary for the particular function to determine the internal function to be executed.

As can be seen, the present illustration can be expanded beyond the audio examples provided into video and to other types of audio or video users. Thus it is contemplated that the same system can support a wide variety of users without having to provide specialized user hardware for a particular type of user.

Thus, a method and apparatus for storing digitized audio/video tracks is disclosed. These specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. A computer-implemented method for storing audio/video data, the computer-implemented method comprising the steps of:

creating a plurality of lists wherein each of the plurality of lists defines a characteristic of the audio/visual data; and linking the plurality of lists according to a data structure such that performing an edit operation on the audio/visual data results in the edit operation being applied simultaneously to the plurality of lists.

2. The computer-implemented method according to claim 1 wherein the plurality of lists comprise an audio/video track.

3. The computer-implemented method according to claim 2 wherein the audio/video track is a static representation of audio/video.

4. The computer-implemented method according to claim 1 wherein each of the plurality of lists maintains two types of events.

5. The computer-implemented method according to claim 4 wherein the two types of events are a silence event and a non-silence event.

6. The computer-implemented method according to claim 1 wherein the edit operation is one of a copy edit operation, a cut edit operation, a clear edit operation, an insert edit operation and a paste edit operation.

7. A machine readable medium having stored thereon data representing sequences of instructions, which when executed by a computer system, cause the computer system to perform the steps of:

creating a plurality of lists wherein each of the plurality of lists defines a characteristic of the audio/visual data; and linking the plurality of lists according to a data structure such that performing an edit operation on the audio/visual data results in the edit operation being applied simultaneously to the plurality of lists.

8. The machine readable medium according to claim 7 wherein the plurality of lists comprise an audio/video track.

9. The machine readable medium according to claim 8 wherein the audio/video track is a static representation of audio/video.

10. The machine readable medium according to claim 7 wherein each of the plurality of lists maintains two types of events.

11. The machine readable medium according to claim 10 wherein the two types of events are a silence event and a non-silence event.

12. The machine readable medium according to claim 7 wherein the edit operation is one of a copy edit operation, a cut edit operation, a clear edit operation, an insert edit operation and a paste edit operation.

13. A system for storing audio/video data, the system comprising:

a plurality of lists wherein each of the plurality of lists defines a characteristic of the audio/visual data; and a data structure linking the plurality of lists such that performing an edit operation on the audio/visual data results in the edit operation being applied simultaneously to the plurality of lists.

14. The system according to claim 13 wherein the plurality of lists comprise an audio/video track.

15. The system according to claim 14 wherein the audio/video track is a static representation of audio/video.

16. The system according to claim 13 wherein each of the plurality of lists maintains two types of events.

17. The system according to claim 16 wherein the two types of events are a silence event and a non-silence event.

18. The system according to claim 13 wherein the edit operation is one of a copy edit operation, a cut edit operation, a clear edit operation, an insert edit operation and a paste edit operation.

* * * * *